(12) United States Patent
Kim et al.

(10) Patent No.: US 12,175,108 B2
(45) Date of Patent: Dec. 24, 2024

(54) MEMORY SYSTEM WITH SECURED PERFORMANCE AND RELIABILITY, MEMORY CONTROLLER AND METHOD OF OPERATING THE SAME

(71) Applicant: SK hynix Inc., Gyeonggi-do (KR)

(72) Inventors: Kwang Su Kim, Gyeonggi-do (KR); Youn Won Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 18/344,893

(22) Filed: Jun. 30, 2023

(65) Prior Publication Data
US 2024/0184469 A1    Jun. 6, 2024

(30) Foreign Application Priority Data
Dec. 2, 2022    (KR) .................. 10-2022-0166651

(51) Int. Cl.
*G06F 12/00*    (2006.01)
*G06F 3/06*    (2006.01)

(52) U.S. Cl.
CPC ............ *G06F 3/064* (2013.01); *G06F 3/0658* (2013.01); *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS 9,229,655 B2    1/2016    Lassa et al.
2007/0022244 A1    1/2007    Kimmery

*Primary Examiner* — Daniel D Tsui
(74) *Attorney, Agent, or Firm* — IP&T GROUP LLP

(57) ABSTRACT

A memory system may include a storage device and a memory controller. The storage device may include a plurality of memory blocks. Each of the memory blocks may include a plurality of pages. The memory controller may perform a maintenance management operation including predetermined numbers of sub-operations performed for a first period in each first cycle on the storage device, wherein the memory controller is configured to increase a reservation number of the sub-operations when a first type command requested from an external device is processed at a time of triggering the sub-operations, and determine a trigger interval of the sub-operations based on the reservation number.

30 Claims, 6 Drawing Sheets

MEMORY SYSTEM WITH SECURED PERFORMANCE AND RELIABILITY, MEMORY CONTROLLER AND METHOD OF OPERATING THE SAME

CROSS-REFERENCES TO RELATED APPLICATION

The present application claims priority under 35 U.S.C. § 119(a) to Korean Patent Application number 10-2022-0166651, filed on Dec. 2, 2022, which is incorporated herein by reference in its entirety.

BACKGROUND

1. Technical Field

Various embodiments of the present disclosure generally relate to a semiconductor integrated device, more particularly, to a memory system with secured performance and reliability, a memory controller and a method of operating the memory controller.

2. Related Art

A memory system may use a volatile memory device or a non-volatile memory device as a storage medium to perform input/output operations in accordance with requests from an external device.

In order to prevent data loss from the memory device as the storage medium, various data maintenance management methods may be used. For example, the data maintenance management operation may be periodically performed to secure reliability of the data in the memory device.

A performance of a memory system may be mainly dependent upon a speed for processing the requests from the external device. When the data maintenance management operation may be performed during processing an external request, the performance of the memory system may fluctuate.

SUMMARY

According to an embodiment of the present disclosure, there may be provided a memory system. The memory system may include a storage device and a memory controller. The storage device may include a plurality of memory blocks. Each of the memory blocks may include a plurality of pages. The memory controller may perform a maintenance management operation including predetermined numbers of sub-operations performed for a first period in each first cycle on the storage device, wherein the memory controller is configured to increase a reservation number of the sub-operations when a first type command requested from an external device is processed at a time of triggering the sub-operations, and determine a trigger interval of the sub-operations based on the reservation number.

According to an embodiment of the present disclosure, there may be provided a memory system. The memory system may include a storage device and a memory controller. The memory controller may perform a maintenance management operation including predetermined numbers of sub-operations performed for a first period in each first cycle on the storage device. The memory controller is configured to reserve performing the sub-operations by a critical number or less while a first type command is processed for a first period, and perform at least part of the reserved sub-operations while processing a second type command different from the first type command.

According to an embodiment of the present disclosure, there may be provided a memory controller. The memory controller may include a scan/refresh logic, a counter and an interval determination circuit. The scan/refresh logic may configured to perform a maintenance management operation including predetermined numbers of sub-operations for a first period in each first cycle on a storage device. The counter may increase a reservation number of the sub-operations when a first type command requested from an external device is processed at a time of triggering the sub-operations. The interval determination circuit may determine a trigger interval of the sub-operations based on the reservation number.

According to an embodiment of the present disclosure, there may be provided a method of operating a memory system. A memory controller may control a storage device including a plurality of memory blocks. In the method of operating the memory system, the memory controller may sequentially trigger a plurality of sub-operations for a first period in each first cycle, the memory controller configured to control the storage device including a plurality of memory blocks; increase a reservation number of the sub-operations when a first type command requested from an external device is processed at a time of triggering the sub-operations; determine a trigger interval of the sub-operations based on the reservation number; and perform a maintenance management operation on the storage device by sequentially performing predetermined numbers of the sub-operations for the first period.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present disclosure will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The present disclosure is described herein with reference to cross-section and/or plan illustrations of idealized embodiments of the present disclosure. However, embodiments of the present disclosure should not be construed as limiting the inventive concept. Although a few embodiments of the present disclosure will be shown and described, it will be appreciated by those of ordinary skill in the art that changes may be made in these embodiments without departing from the principles and spirit of the present disclosure.

Figure 1:
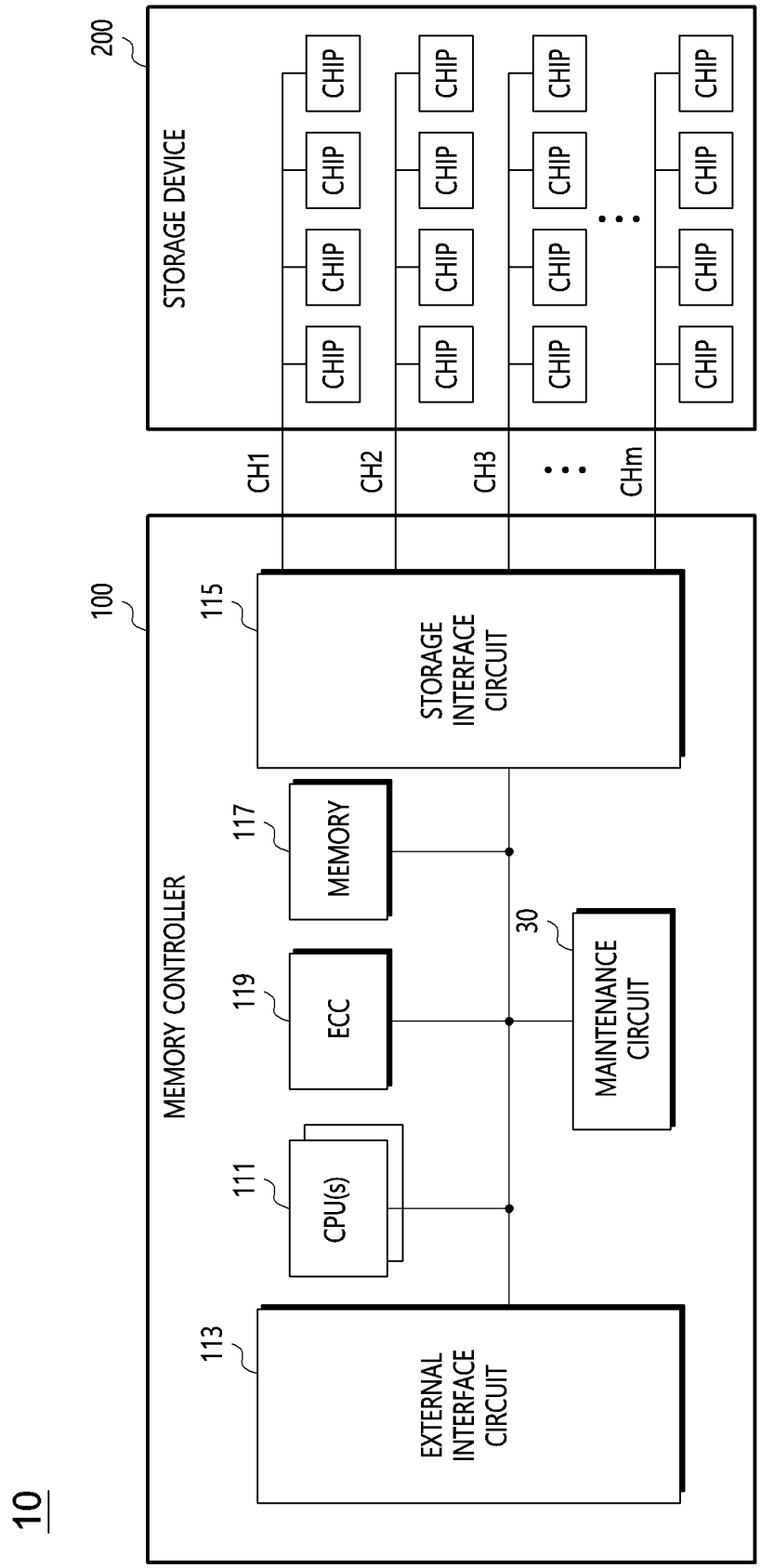
FIG. 1 is a view illustrating a memory system in accordance with an embodiment of the present disclosure.

FIG. 1 is a view illustrating a memory system 10 in accordance with an embodiment of the present disclosure.

Referring to FIG. 1, the memory system 10 may include a memory controller 100 and a storage device 200. The memory system 10 may be electrically connected with an external device (i.e., a host) to communicate with the external device.

The external device may include a personal computer, a laptop computer, a server computer, a workstation, a tablet PC, a drone, an advanced drivers assistance system (ADAS), a smart TV, a smart phone, a medical device, a display device, a calibration device, an internet of thing (IoT), etc.

The storage device 200 may include at least one of a volatile memory device and a non-volatile memory device. The storage device 200 may be connected with the memory controller 100 through a plurality of channels CH1 to CHm. The storage device 200 may include a plurality of memory chips CHIPs or a plurality of packages.

Figure 2:
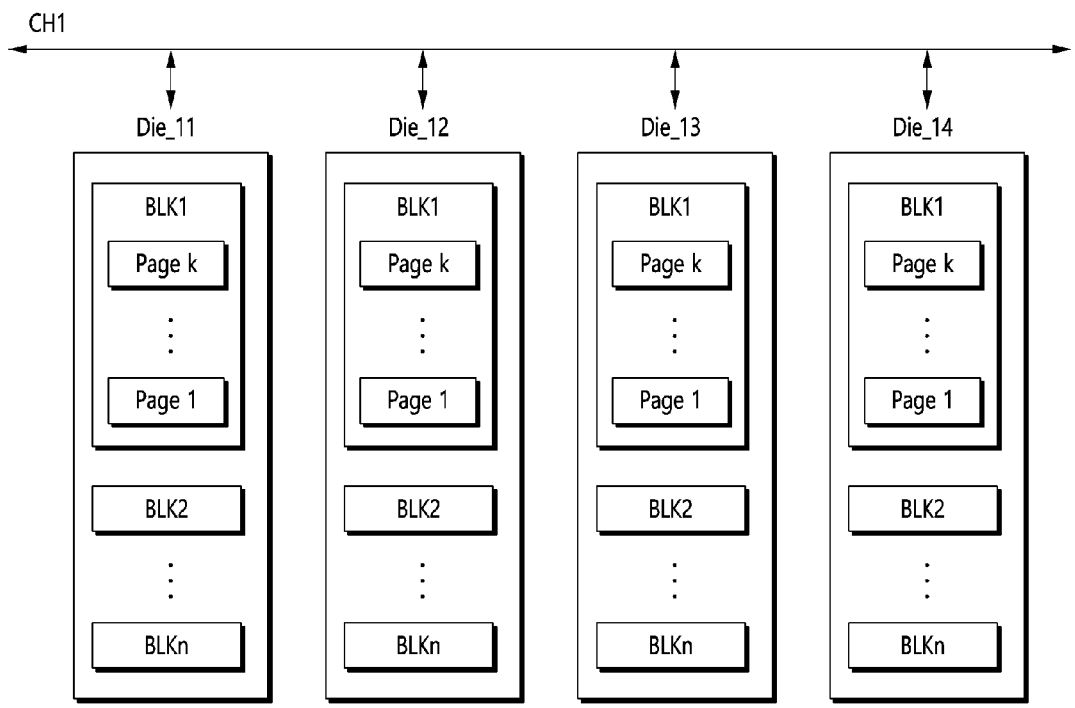
FIG. 2 is a view illustrating a storage device in accordance with an embodiment of the present disclosure.

FIG. 2 is a view illustrating a storage device in accordance with an embodiment of the present disclosure.

Referring to FIG. 2, each of the memory chips CHIPs in the storage device 200 may include a plurality of memory dies Die_11 to Die_14. The storage device 200 may be controlled by the memory controller 100 in FIG. 1.

The memory controller 100 may be connected with the dies Die_11 to Die_14 through a channel (e.g., CH1). Numbers of the channels and numbers of the dies connected to each of the channels may not be restricted within the structure in FIGS. 1 and 2.

Each of the dies Die_11 to Die_14 may include at least one plane. For conveniences of description, a case where one die includes one plane is illustrated in FIG. 2.

The plane may include a plurality of memory blocks BLK1 to BLKn, where n is a natural number greater than 1. Each of the memory blocks may include a plurality of pages Page 1 to Page k, where k is a natural number greater than 1.

The memory controller 100 may control the storage device 200 according to a request of the external device. For example, the memory controller 100 may program data in the storage device 200 according to a write request of the external device. The memory controller 100 may provide the external device with data read from the storage device 200 according to a read request of the external device.

Referring back to FIG. 1, the memory controller 100 may include at least one processor (CPU) 111, an external interface circuit 113, a storage interface circuit 115, a memory 117, an error correction circuit (ECC) 119 and a maintenance management circuit 30.

The processor 111 may include a combination of a hardware and a firmware or a software operated on the hardware. The hardware may be operated by processing the firmware or the software for operating the memory system 10. In an embodiment, the processor 111 may perform a flash translation layer (FTL) for managing the storage device 200, for example, a garbage collection, an address mapping, a wear leveling, etc.

The external interface circuit 113 may provide communication channels for receiving a command and a clock signal from the external device and controlling input/output of data under the control of the processor 111. The external interface circuit 113 may provide a physical connection between the external device and the memory system 10.

In an embodiment, the external interface circuit 113 may communicate with the external device based on an interface using at least one of a USB protocol, a multimedia card protocol, PCI (peripheral component interconnection) protocol, PCI-E (PCI-express) protocol, ATA (Advanced Technology Attachment) protocol, SATA (Serial-ATA) protocol, PATA (Parallel-ATA) protocol, SCSI (small computer small interface) protocol, ESDI (enhanced small disk interface) protocol, IDE (Integrated Drive Electronics) protocol, private protocol, SMBus (System Management Bus) protocol, I2C (Inter-Integrated Circuit) protocol, I3C (Improved Inter-Integrated Circuit) protocol, etc.

The storage interface circuit 115 may provide communication channels between the memory controller 100 and the storage device 200. The storage interface circuit 115 may provide data temporarily stored in a buffer memory to the storage device 200 under the control of the processor 111. The storage interface circuit 115 may transmit data read from the storage device 200 to the buffer memory. The read data may be temporarily stored in the buffer memory. The buffer memory may be provided inside or outside the memory controller 100.

The memory 117 may store data for operating the memory controller 100 or data generated by the memory controller 100. In an embodiment, the memory 117 may serve as the buffer memory.

The ECC 119 may encode data provided from the external device or the processor 111 in a set manner to store the encoded data in the storage device 200. Further, the ECC 119 may decode data read from the storage device 200. The ECC 119 may correct an error in the decoded read data and provide the external device or the processor 111 with the error-corrected data.

The maintenance management circuit 30 may perform a maintenance management operation (i.e., a house-keeping operation) on the data stored in the storage device 200.

The maintenance management operation may trigger a maintenance management mode in each first cycle. The maintenance management operation may then be performed for a first period. The maintenance management operation may perform a scan and refresh operation. The maintenance management operation may read or scan the data in specific pages by the normally operated memory blocks in the storage device 200. When a fail bit greater than an allowable number may be detected, the data in the corresponding memory block may be refreshed. The first period may be substantially the same as the first cycle, and is not limited thereto.

Particularly, the maintenance management circuit 30 may perform the maintenance management operation by performing predetermined (or designated) numbers of sub-operations in the maintenance management mode for the first period in each first cycle. That is, the scan and refresh operation on all memory blocks may be performed by the sub-operations. The sub-operations may be triggered by a first interval to perform the scanning on all memory blocks for the first period. The maintenance management circuit 30 may determine a trigger interval of the sub-operations in accordance with types of commands processed by the memory system 10 when the sub-operations are triggered.

Figure 3:
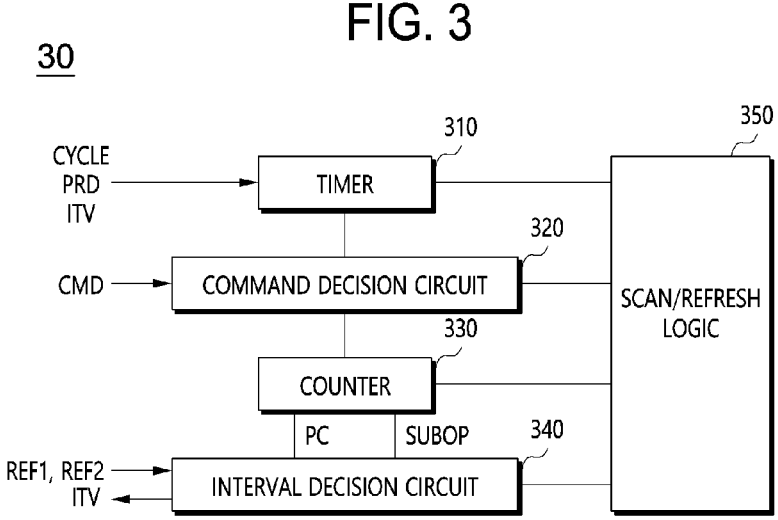
FIG. 3 is a detailed view illustrating a maintenance management circuit in accordance with an embodiment of the present disclosure.

FIG. 3 is a detailed view illustrating the maintenance management circuit 30 in accordance with an embodiment of the present disclosure.

Referring to FIG. 3, if the memory system 10 processes a first type command in a case where the sub-operations are triggered by the first interval, the maintenance management circuit 30 may increase a reservation number (i.e., a pending number) and determine the trigger interval of the sub-operations based on the reservation number. For example, the maintenance management circuit 30 may change the trigger interval of the sub-operations by a second interval shorter than the first interval. Further, when the sub-operations are performed while processing a second type command different from the first type command, the reservation number may be subtracted (i.e., decreased). If the memory system 10 processes the first type command in a case where the sub-operations are triggered by the second interval, the maintenance management circuit 30 may maintain the trigger interval as the second interval.

In an embodiment, the first type command may include a sequential read command for designating a last logical address of a previous read operation as an initial logical address of a next read command, not limited thereto. The second type command may include a random read command where the last logical address of the previous read operation may not be the initial logical address of the next read command, and is not limited thereto.

The sub-operations which are triggered while processing the first type command by the memory system 10, may be reserved or performed, based on the reservation number. For example, when the reservation number may reach a predetermined critical value, the sub-operations may be performed, i.e., not reserved, regardless of the type of the processed command.

In a different view, the maintenance management circuit 30 may process the predetermined numbers of the sub-operations for the first period. The maintenance management circuit 30 may reserve processing the sub-operations by a number less than the critical value while the first type command is processed for the first period. The reserved sub-operations may be processed while the second type command is processed.

Referring to FIG. 3, the maintenance management circuit 30 may include a timer 310, a command decision circuit 320, a counter 330, an interval decision circuit 340 and a scan/refresh logic 350.

The timer 310 may check whether the first cycle CYCLE as an operation cycle of the data maintenance management, the first period PRD in which the maintenance management mode is performed, and the sub-operation trigger interval ITV arrive or not. When the first cycle CYCLE arrives, the timer 310 may transmit a control signal to the scan/refresh logic 350 to trigger the sub-operations in accordance with the trigger interval ITV changed or maintained in the first period PRD. The sub-operation trigger interval ITV may be determined as an initial value, for example, the first interval when the maintenance management mode is started.

The command decision circuit 320 may judge (i.e., decide or determine) the type of the command performed at a time of triggering the sub-operations, while the maintenance management operation is performed for the first period in each first cycle.

The counter 330 may increase or decrease the reservation number PC based on decision results of the command decision circuit 320. For example, when the command CMD is the first type while the sub-operations are triggered for the first period, the counter 330 may increase and output the reservation number PC. When the sub-operations are performed while processing the second type command, the counter 330 may decrease and output the reservation number PC. The reservation number is an integer number between '0' and the predetermined critical value. Thus, the reservation number may be increased to the critical value. The reservation number may be decreased to '0'. The counter 330 may count performance numbers of the sub-operations for the first period by performing the sub-operations in the scan/refresh logic 350.

The interval decision circuit 340 may determine (or decide) the sub-operation trigger interval based on the reservation number provided from the counter 330 for the first period.

In an embodiment, the interval decision circuit 340 may compare the reservation number PC with a first reference value REF1=0. When the reservation number PC is the first reference value REF1=0, that is, the reserved sub-operation(s) does not exist, the interval decision circuit 340 may maintain the sub-operation trigger interval as the first interval. The interval decision circuit 340 may compare the reservation number PC with the first reference value REF1=0 and a second reference value REF2=critical value. When the reservation number PC is between the first reference value REF1=0 and the second reference value REF2=critical value, the interval decision circuit 340 may determine the sub-operation trigger interval as a second interval, for example, a half of the first interval. When the reservation number PC may reach the second reference value REF2=critical value, the interval decision circuit 340 may determine the sub-operation trigger interval as the second interval. The sub-operation trigger interval based on the reservation number PC may not be restricted within the above-mentioned condition. For example, the sub-operation trigger interval may be determined as an interval for performing all predetermined numbers of the sub-operations for the first period based on a residual time of the first period and a non-performed number of the sub-operations.

The scan/refresh logic 350 may perform the maintenance management operation on the stage device 200 when the sub-operations are triggered and the reservation number is the critical value while processing the first type command, or when the sub-operations are triggered while processing the second type command. The maintenance management operation may include an operation for refreshing data in a corresponding memory block when a fail bit greater than an allowable number may be detected in scanning the data in a specific page of the memory block.

Figure 4:
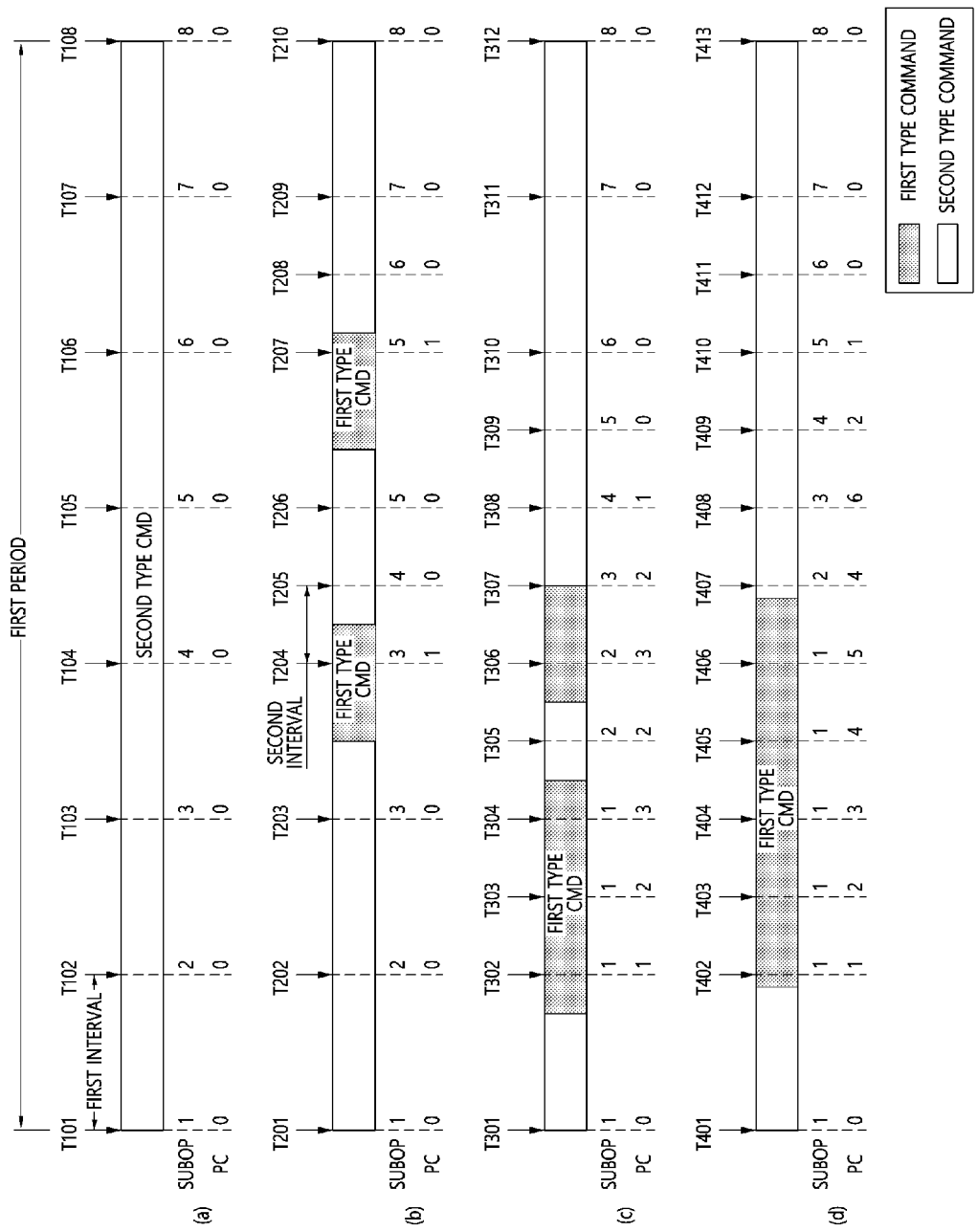
FIG. 4 is a view illustrating an operation of a maintenance management circuit in accordance with an embodiment of the present disclosure.

FIG. 4 is a view illustrating an operation of a maintenance management circuit in accordance with an embodiment of the present disclosure.

FIG. 4 shows a scan/refresh operation by performing eight sub-operations for a first period.

Referring to (a) of FIG. 4, while a second type command (CMD) requested from the external device is processed for the first period, sub-operations for a maintenance management operation may be triggered by a first interval. The first interval may be determined for performing a scan/refresh on all memory blocks for the first period.

A sub-operation performance number No_SUBOP and a reservation number PC may be counted whenever the sub-operations are triggered at every time T101 to T108.

In (a) of FIG. 4, the second type command and the sub-maintenance management operation may be overlapped with each other so that the sub-operations may be performed by the first interval, and not be reserved.

Referring to (b) of FIG. 4, because the second type command is being processed when the sub-operations are triggered by the first interval at first to third times T101 to T103, the sub-operations may be performed without the reservation so that the performance number of the sub-operations may be increased from 1 to 3. In contrast, the reservation number PC may be maintained as '0'.

When the sub-operation is triggered at the fourth time T204, because the first type command is being processed, the reservation number PC may be increased to 1 and the sub-operation may be reserved. Further, because the reservation number PC is between '0' and the critical value, for example, 5, the trigger interval of the sub-operations may be changed into the second interval.

When the sub-operation is triggered at the fifth time T205 after the second interval, because the second type command is being processed, the sub-operation may be performed without the reservation so that the performance number SUBOP of the sub-operations may be increased to 4. Because the reservation number PC is 1, not '0', the reservation number PC may be decreased from 1 to '0' and the trigger interval of the sub-operations may be maintained as the second interval.

When the sub-operation is triggered at the sixth time T206 after the second interval, because the second type command is being processed, the sub-operation may be performed without the reservation so that the performance number SUBOP of the sub-operations may be increased to 5. Because the reservation number PC at the trigger time of the sub-operation is '0', the trigger interval of the sub-operations may be changed into the first interval.

When the sub-operation is triggered at the seventh time T207 after the first interval, because the first type command is being processed, the sub-operation may be reserved so that the performance number SUBOP of the sub-operations may be maintained as 5. The reservation number PC may be increased from '0' to 1. The trigger interval of the sub-operations may be changed into the second interval.

When the sub-operation is triggered at the eighth time T208, because the second type command is being processed, the sub-operation may be performed without the reservation so that the performance number SUBOP of the sub-operations may be increased to 6. Because the reservation number PC is 1, not '0', the trigger interval of the sub-operations may be maintained as the second interval. The reservation number PC may be decreased from 1 to 0.

When the sub-operation is triggered at the ninth time T209, because the second type command is being processed, the sub-operation may be performed without the reservation so that the performance number SUBOP of the sub-operations may be increased to 7. Because the reservation number PC of the sub-operation is '0', the trigger interval of the sub-operations may be changed into the first interval.

When the sub-operation is triggered at the tenth time T210 after the first interval, because the second type command is being processed, the sub-operation may be performed without the reservation so that the performance number SUBOP of the sub-operations may be increased to 8. The reservation number PC of the sub-operations may be maintained as '0'.

According to an embodiment, the trigger interval may be determined by the above-mentioned method to trigger the sub-operation(s). The sub-operation(s) may be performed or reserved in accordance with the types of the command processed at the trigger time. The performance number SUBOP and the reservation number PC of the sub-operation may be counted in accordance with the performed or reserved sub-operation(s).

As a result, the desired eight sub-operations may be performed for the first period.

Referring to (c) of FIG. 4, the sub-operation may be once performed at the first time T301. The sub-operation may be triggered at the second time T302 after the first interval. Because the first type command is being processed, the trigger interval may be changed into the second interval.

The sub-operation triggered to the fourth time T304 by the second interval may be reserved so that the performance number SUBOP of the sub-operation may be maintained at 1 and the reservation number PC may be increased to 3.

Because the reservation number PC may be between '0' and the critical value, the trigger interval may be maintained as the second interval so that the sub-operation may be triggered at the fifth time T305. Because the second type command is being processed, the sub-operation may be performed.

Therefore, the performance number SUBOP of the sub-operation is 5 and the reservation number PC may be decreased from 1 to '0' at the ninth time T309.

When the sub-operation is triggered at the tenth time T310, because the second type command is being processed, the sub-operation may be performed. Because the reservation number PC is '0', the trigger interval may be changed into the first interval.

The sub-operations may be performed by the first interval so that the desired eight sub-operations may be performed during the first period.

Referring to (d) of FIG. 4, after the sub-operation is once performed at the first time T401, the first type command may be processed so that the reservation number PC may reach the critical value, i.e., 5 at the sixth time T406.

When the sub-operation is triggered at the seventh time T407, because the second type command is being processed, the sub-operation may be performed. Thus, the performance number SUBOP of the sub-operation may be changed into 2 and the reservation number PC may be changed into 4. The trigger interval may be maintained as the second interval.

The eleventh time T411 may arrive under a condition that the performance number SUBOP is 5 and the reservation number PC is 1 so that the sub-operation may be triggered. Because the second type command is being processed, the sub-operation may be performed. The performance number SUBOP of the sub-operation may be changed into 6 and the reservation number PC of the sub-operation may be changed from 1 to '0'.

When the sub-operation is triggered at the twelfth time T412, the sub-operation may be performed. Because the reservation number PC is '0', the trigger interval may be changed into the first interval.

Thus, when the sub-operation is triggered at the thirteenth time T413 after the first interval, the desired eight sub-operations may be performed during the first period.

According to an embodiment, the sub-operation(s) reserved while processing the first type command may be performed while processing the second type command. The trigger interval may be determined to perform the desired numbers of the sub-operations during the first period.

Figure 5:
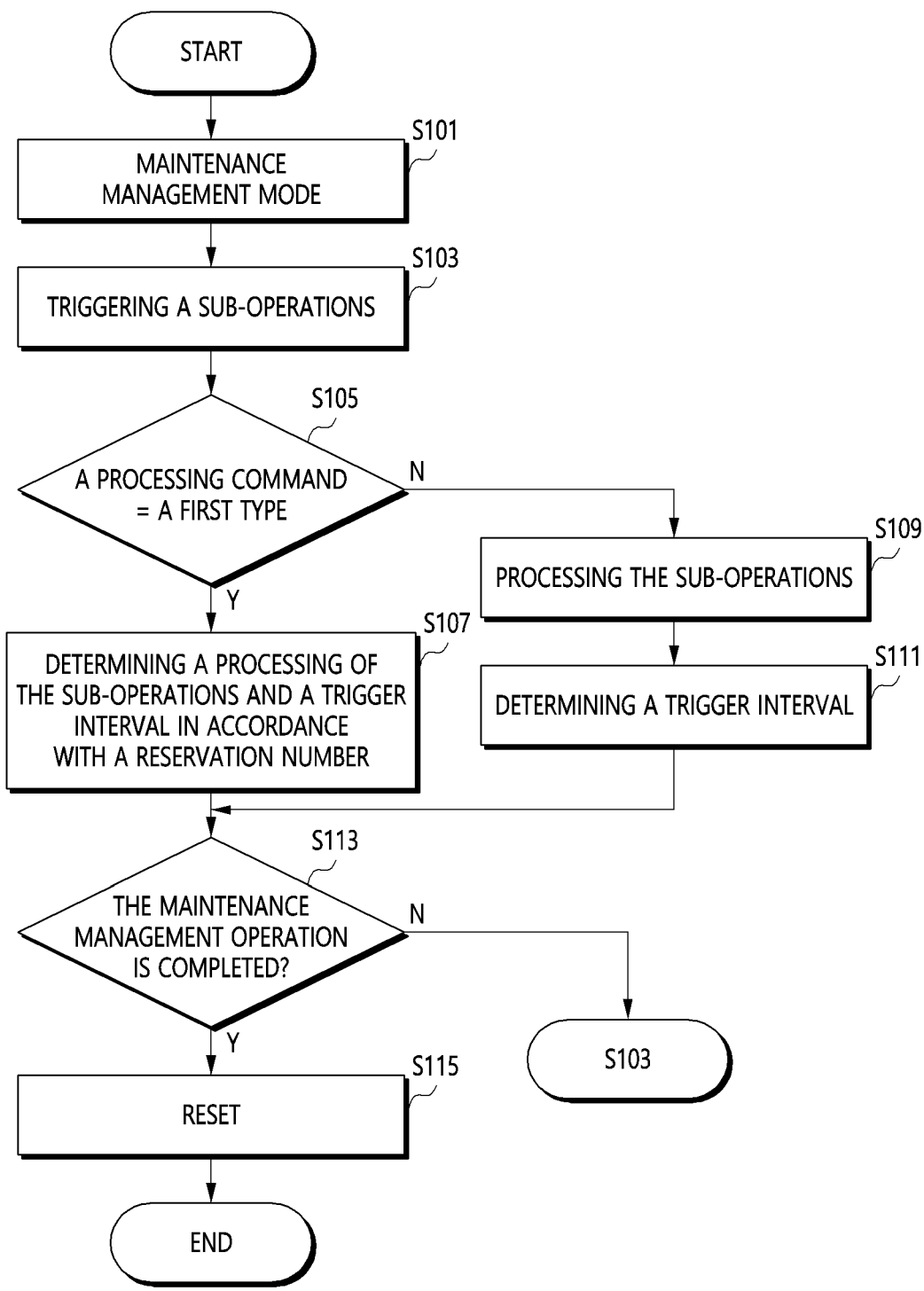
FIG. 5 is a flowchart illustrating a method of operating a memory system in accordance with an embodiment of the present disclosure.

FIG. 5 is a flowchart illustrating a method of operating a memory system in accordance with an embodiment of the present disclosure.

Referring to FIG. 5, in operation S101, the memory controller 100 may enter into the maintenance management mode in each first cycle. In operation S103, the memory controller 100 may trigger the sub-operations for the first period by a set interval. For example, the sub-operation in the maintenance management mode may be triggered by an initial value, for example, the first interval. That is, the memory controller 100 may sequentially trigger the set numbers of the sub-operations to perform the maintenance management operation for the first period in each first cycle on the storage device 200.

In operation S105, when the sub-operations are triggered, the memory controller 100 may check whether the processed command may correspond to the first type or not in accordance with the request from the external device. In an embodiment, the first type command may include a sequential read command for designating a last logical address in a previous read operation as an initial logical address in a next read operation, not limited thereto.

When the processed command is the first type (Y in operation S105), the memory controller 100 may determine the sub-operations and the trigger interval based on the reservation number of the sub-operations (operation S107).

For example, when the reservation number is between 1 and the critical value, the trigger interval of the sub-operations may be determined after reserving the sub-operation(s). The memory controller 100 may increase the reservation number. When the reservation number is the critical number, the sub-operation(s) may be performed, although the first type command is processed to determine the trigger interval of the sub-operations. The memory controller 100 may maintain, not decrease, the reservation number. In contrast, when the processed command is not the first type (N in operation S105), the memory controller 100 may process the sub-operations (operation S109). In operation S111, the memory controller 100 may determine the trigger interval of the sub-operations. The memory controller 100 may decrease the reservation number.

The reservation number is an integer between '0' and the critical value. Thus, the reservation number may be increased to the critical value and decreased to '0'.

In operation S113, the memory controller 100 may check whether the maintenance management operation is completed or not. When the maintenance management operation is not completed (N in the operation S113), the memory controller 100 may trigger the sub-operations based on the interval determined in the operation S107 or S111.

In contrast, when the maintenance management operation is completed (Y in operation S113), the memory controller 100 may reset the trigger interval as the initial value (operation S115).

Figure 6:
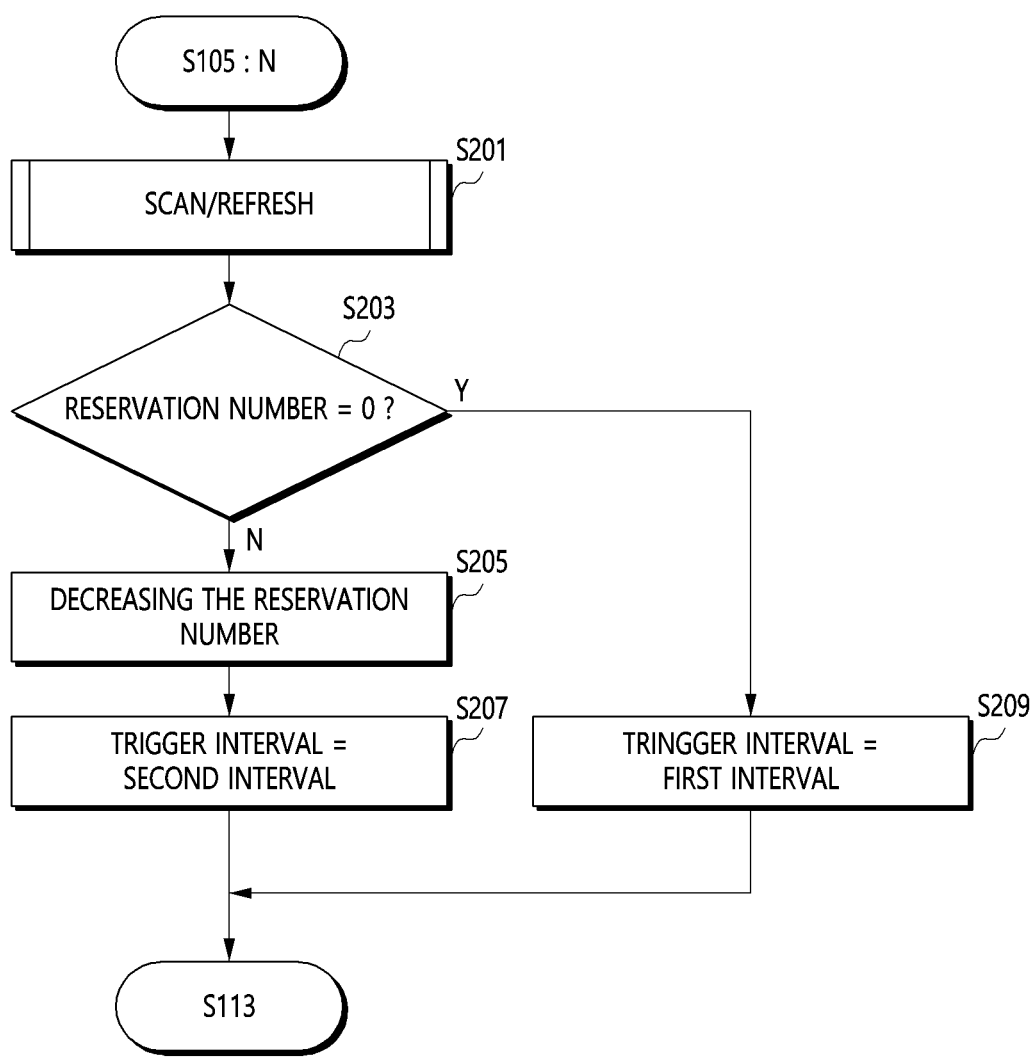
FIG. 6 is a flowchart illustrating a method of operating a memory system in accordance with an embodiment of the present disclosure.

FIG. 6 is a flowchart illustrating a method of operating a memory system in accordance with an embodiment of the present disclosure.

FIG. 6 shows a case where the processed command is not the first type when the sub-operations are triggered in the operation S105 of FIG. 5.

Referring to FIG. 6, in operation S201, the memory controller 100 may perform the sub-operation, i.e., the scan/refresh operation on the set numbers of the memory blocks. In operation S203, the memory controller 100 may determine whether the reservation number is '0' or not.

When the reservation number is '0' (Y in step S203), the memory controller 100 may determine the trigger interval as the first interval (operation S209). In contrast, when the reservation number is not '0' (N in operation S203), the memory controller 100 may decrease the reservation number (operation S205) and determine the trigger interval as the second interval shorter than the first interval (operation S207).

In operation S113, the memory controller 100 may check whether the maintenance management operation is completed or not.

When the reserved sub-operation(s) exists, i.e., the reservation number is not '0', the memory controller 100 may frequently trigger the sub-operation so that the desired numbers of the sub-operations may be performed during the first period.

Figure 7:
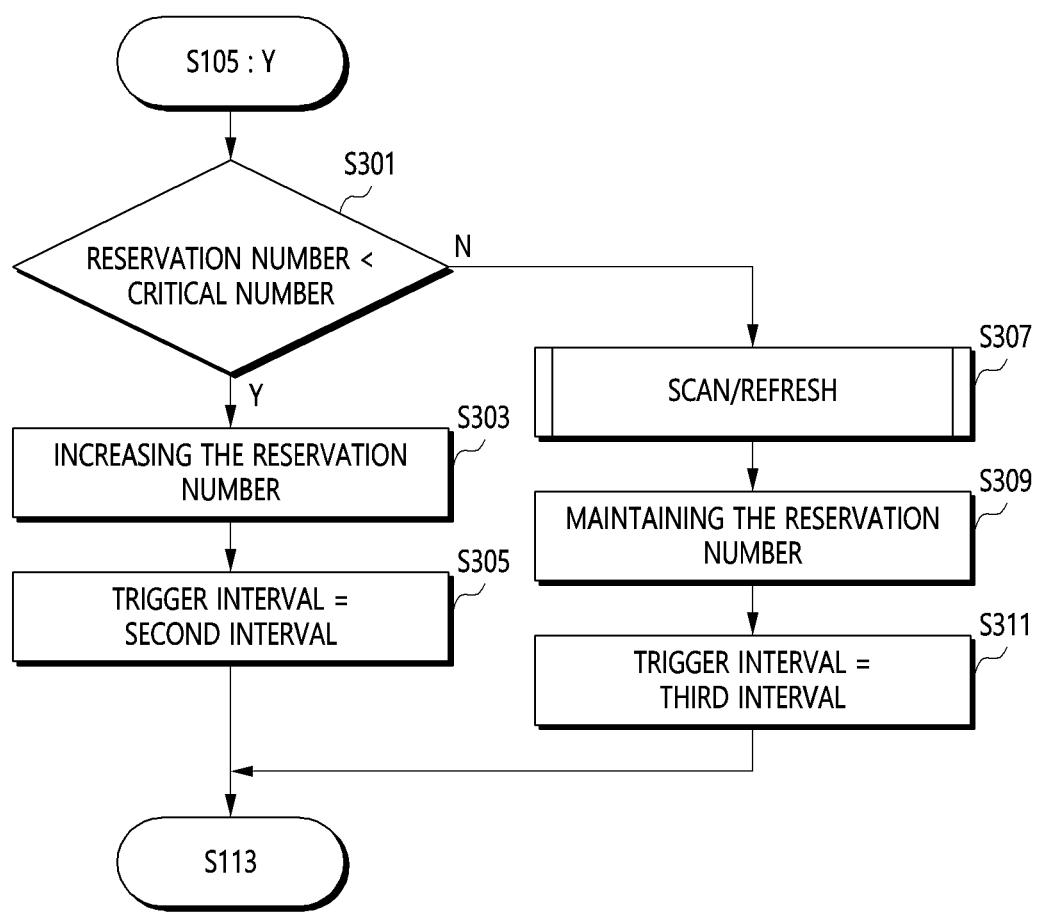
FIG. 7 is a flowchart illustrating a method of operating a memory system in accordance with an embodiment of the present disclosure.

FIG. 7 is a flowchart illustrating a method of operating a memory system in accordance with an embodiment of the present disclosure.

FIG. 7 shows a case where the processed command is the first type when the sub-operations are triggered in the operation S105 of FIG. 5.

Referring to FIG. 7, in operation S301, the memory controller 100 may check whether the reservation number is less than the critical value or not.

When the reservation number is less than the critical value (Y in operation S301), the memory controller 100 may increase the reservation number (operation S303). In operation S305, the memory controller 100 may determine the trigger interval of the sub-operation as the second interval shorter than the first interval. In operation S113, the memory controller 100 may check whether the maintenance management operation is completed or not.

In contrast, when the reservation number is not less than the critical value, i.e., the reservation number reaches the critical value (N in operation S301), the memory controller 100 may perform the sub-operation, i.e., the scan/refresh operation on all memory blocks (operation S307).

In operation S309, the memory controller 100 may maintain the reservation number. In operation S311, the memory controller 100 may determine the trigger interval as a third interval. Then, the memory controller 100 may check whether the maintenance management operation is completed or not (the operation S113).

The third interval may be substantially equal to or different from the first interval or the second interval. The third interval may be determined for performing the desired numbers of the sub-operations for the first period based on the residual time of the first period and the non-performed numbers of the sub-operations.

According to an embodiment, the predetermined numbers of the sub-operations may be performed for the first period. While the first type command is processed for the first period, performing the sub-operations may be reserved by the critical number or less. The reserved sub-operation(s) may be performed while processing the second type command for the first period, not the first type command. Therefore, the process capacity with respect to the request of the external device can be maintained and reliability with respect to the stored data can be secured.

The above described embodiments of the present disclosure are intended to illustrate and not to limit the disclosure. Various alternatives and equivalents are possible. The invention is not limited by the embodiments described herein. Nor is the invention limited to any specific type of semiconductor device. Other additions, subtractions, or modifications will be apparent in view of the present disclosure and are intended to fall within the scope of the appended claims. Furthermore, the embodiments may be combined to form additional embodiments.

What is claimed is:

1. A memory system comprising:
a storage device including a plurality of memory blocks, each of the memory blocks including a plurality of pages; and
a memory controller configured to perform a maintenance management operation including predetermined numbers of sub-operations performed for a first period in each first cycle on the storage device,
wherein the memory controller is configured to
increase a reservation number of the sub-operations when a first type command requested from an external device is processed at a time of triggering the sub-operations, and
determine a trigger interval of the sub-operations based on the reservation number.

2. The memory system of claim 1,
wherein an initial value of the trigger interval is a first interval, and
wherein the first interval is determined for performing the maintenance management operation on all normally operated memory blocks for the first period.

3. The memory system of claim 1,
wherein an initial value of the trigger interval is a first interval, and
wherein the memory controller determines the trigger interval as the first interval when a second type command different from the first type command is processed and the reservation number is '0' at the time of triggering the sub-operations.

4. The memory system of claim 1,
wherein an initial value of the trigger interval is a first interval, and
wherein the memory controller determines the trigger interval as a second interval shorter than the first interval when a second type command different from the first type command is processed and the reservation number is not '0' at the time of triggering the sub-operations.

5. The memory system of claim 1,
wherein an initial value of the trigger interval is a first interval, and
wherein the memory controller determines the trigger interval as a second interval shorter than the first interval when the first type command is processed and the reservation number is less than a critical value at a time of triggering the sub-operations.

6. The memory system of claim 1,
wherein an initial value of the trigger interval is a first interval, and
wherein the memory controller determines the trigger interval as the first interval, a second interval shorter than the first interval, or a third interval different from the first and second intervals when the first type command is processed and the reservation number is a critical value at a time of triggering the sub-operations.

7. The memory system of claim 1,
wherein the memory controller performs the sub-operations and subtracts the reservation number when a second type command different from the first type command is processed at the time of triggering the sub-operations, and
wherein the memory controller performs the sub-operations when the first type command is processed and the reservation number is a critical number at the time of triggering the sub-operations.

8. The memory system of claim 1, wherein the memory controller reserves the sub-operations and increases the reservation number when the first type command is processed and the reservation number is less than a critical number at the time of triggering the sub-operations, and
wherein the reservation number is the critical number or less.

9. The memory system of claim 1, wherein the memory controller determines the trigger interval for performing the maintenance management operation on all normally operated memory blocks for the first period.

10. The memory system of claim 1, wherein the maintenance management operation comprises an operation for reading data from a page of a normally operated memory block and refreshing data a memory block where a fail bit greater than an allowable number is detected.

11. A memory system comprising:
a storage device; and
a memory controller configured to perform a maintenance management operation including predetermined numbers of sub-operations performed for a first period in each first cycle on the storage device,
wherein the memory controller is configured to
reserve performing the sub-operations by a critical number or less while a first type command is processed for a first period, and
perform at least part of the reserved sub-operations while processing a second type command different from the first type command.

12. The memory system of claim 11, wherein the memory controller performs the sub-operations when the sub-operations are triggered while processing the first type command and a reservation number of the sub-operations reaches the critical number.

13. A memory controller comprising:
a scan/refresh logic configured to perform a maintenance management operation including predetermined numbers of sub-operations for a first period in each first cycle on a storage device;
a counter configured to increase a reservation number of the sub-operations when a first type command requested from an external device is processed at a time of triggering the sub-operations; and
an interval decision circuit configured to determine a trigger interval of the sub-operations based on the reservation number.

14. The memory controller of claim 13,
wherein an initial value of the trigger interval is a first interval, and
wherein the memory controller determines the trigger interval as the first interval when a second type command different from the first type command is processed and the reservation number is '0' at the time of triggering the sub-operations.

15. The memory controller of claim 13,
wherein an initial value of the trigger interval is a first interval, and
wherein the memory controller determines the trigger interval as a second interval shorter than the first interval when a second type command different from the first type command is processed and the reservation number is not '0' at the time of triggering the sub-operations.

16. The memory controller of claim 13,
wherein an initial value of the trigger interval is a first interval, and wherein the interval decision circuit determines the trigger interval as a second interval shorter than the first interval when the first type command is processed and the reservation number is less than a critical value at the time of triggering the sub-operations.

17. The memory controller of claim 13,
wherein an initial value of the trigger interval is a first interval, and
wherein the interval decision circuit determines the trigger interval as the first interval, a second interval shorter than the first interval, or a third interval different from the first and second intervals when the first type command is processed and the reservation number is a critical value at the time of triggering the sub-operations.

18. The memory controller of claim 13,
wherein the scan/refresh logic performs the sub-operations and subtracts the reservation number when a second type command different from the first type command is processed at the time of triggering the sub-operations, and
wherein the scan/refresh logic performs the sub-operation when the first type command is processed and the reservation number is a critical number at the time of triggering the sub-operation.

19. The memory controller of claim 13, wherein the scan/refresh logic reserves the sub-operation and increases the reservation number when the first type command is processed and the reservation number is less than a critical number at the time of triggering the sub-operation, and the reservation number is the critical number or less.

20. The memory controller of claim 13, wherein the interval decision circuit determines the trigger interval for performing the maintenance management operation on all normally operated memory blocks for the first period.

21. A method of operating a memory system including a storage device and a memory controller, the method comprising:
sequentially triggering, by the memory controller, a plurality of sub-operations for a first period in each first cycle, the memory controller configured to control the storage device including a plurality of memory blocks;
increasing, by the memory controller, a reservation number of the sub-operations when a first type command requested from an external device is processed at a time of triggering the sub-operations;
determining, by the memory controller, a trigger interval of the sub-operations based on the reservation number; and
performing, by the memory controller, a maintenance management operation on the storage device by sequentially performing predetermined numbers of the sub-operations for the first period.

22. The method of claim 21,
wherein an initial value of the trigger interval is a first interval, and
wherein the first interval is determined for performing the maintenance management operation on all normally operated memory blocks for the first period.

23. The method of claim 21,
wherein an initial value of the trigger interval is a first interval, and
wherein the memory controller determines the trigger interval as the first interval when a second type command different from the first type command is processed and the reservation number is '0' at the time of triggering the sub-operations.

24. The method of claim 21,
wherein an initial value of the trigger interval is a first interval, and
wherein the memory controller determines the trigger interval as a second interval shorter than the first interval when a second type command different from the first type command is processed and the reservation number is not '0' at the time of triggering the sub-operations.

25. The method of claim 21,
wherein an initial value of the trigger interval is a first interval, and
wherein the memory controller determines the trigger interval as a second interval shorter than the first interval when the first type command is processed and the reservation number is less than a critical value at the time of triggering the sub-operations.

26. The method of claim 21,
wherein an initial value of the trigger interval is a first interval, and
wherein the memory controller determines the trigger interval as the first interval, a second interval shorter than the first interval, or a third interval different from the first and second intervals when the first type command is processed and the reservation number is a critical value at the time of triggering the sub-operations.

27. The method of claim 21, further comprising:
performing the sub-operations and subtracting the reservation number when a second type command different from the first type command is processed at the time of triggering the sub-operations; and
performing the sub-operations when the first type command is processed and the reservation number is a critical number at the time of triggering the sub-operations.

28. The method of claim 21, further comprising:
reserving the sub-operations and increasing the reservation number when the first type command is processed and the reservation number is less than a critical number at the time of triggering the sub-operations, and the reservation number is the critical number or less.

29. The method of claim 21, wherein the trigger interval is determined for performing the maintenance management operation on all normally operated memory blocks for the first period.

30. The method of claim 21,
wherein each of the memory blocks comprises a plurality of pages, and
wherein the maintenance management operation comprises an operation for reading data from a page of a normally operated memory block and refreshing a memory block where a fail bit greater than an allowable number is detected.

* * * * *